July 10, 1951     A. K. STEVENS     2,560,198
ANTISKID DEVICE
Filed Aug. 3, 1948     2 Sheets-Sheet 1
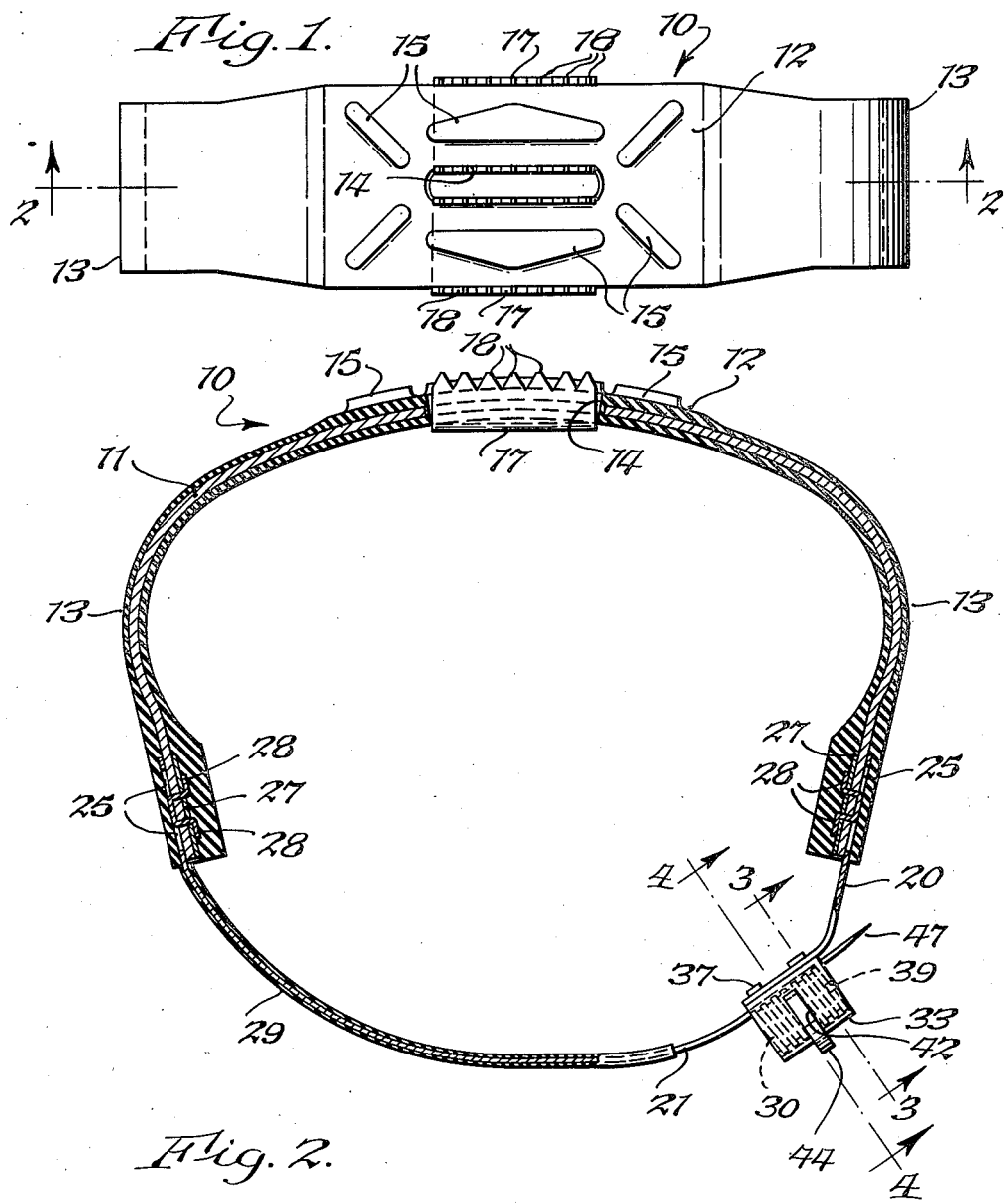
INVENTOR.
Adolph K. Stevens,
BY Parker, Prochnow & Farmer,
Attorneys.

July 10, 1951 A. K. STEVENS 2,560,198
ANTISKID DEVICE
Filed Aug. 3, 1948 2 Sheets-Sheet 2
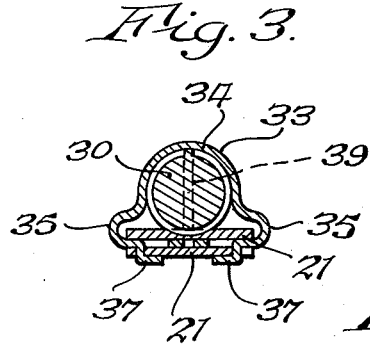
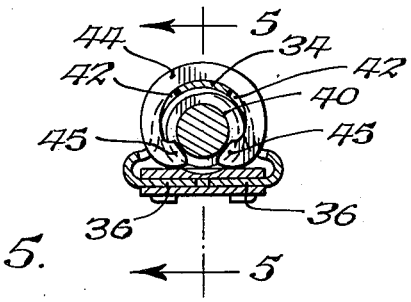
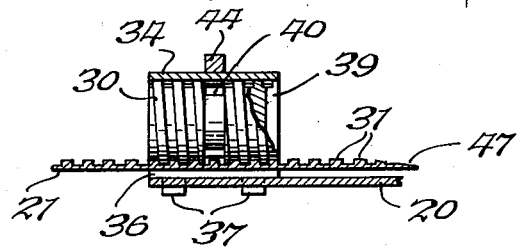
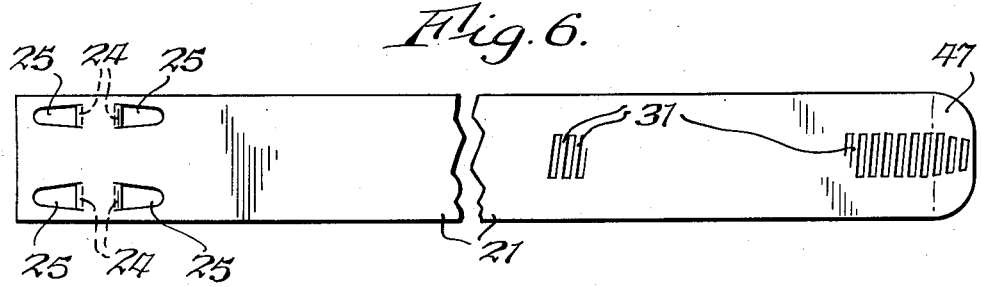
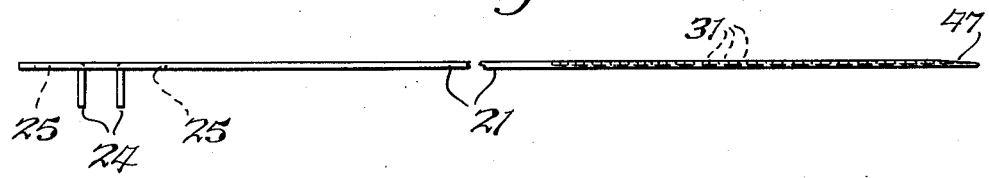
INVENTOR.
Adolph K. Stevens
BY Parker, Prochnow & Farmer,
Attorneys.

UNITED STATES PATENT OFFICE 2,560,198

ANTISKID DEVICE

Adolph K. Stevens, Buffalo, N. Y.

Application August 3, 1948, Serial No. 42,280

1 Claim. (Cl. 152—222)

This invention relates to improvements in anti-skid devices for use on vehicle tires mounted on wheel rims, to prevent slipping and skidding of the vehicle.

One of the objects of this invention is to provide an anti-skid device of this type of an improved and simplified construction by means of which the anti-skid device may be more readily tions 13 which are formed integral with the tread portion and which extend along opposite side walls of the tire. The tread portion is intended to overlie the tread portion of the tire and is preferably made of greater thickness than the side portions for the purpose of enabling the tread portion to resist wear to which it is subjected during the driving of the vehicle.

provided with slots or apertures through which the tongues 24 may extend. The ends of the tongues are then bent over as shown at 28 in Fig. 2, thus forming a strong and durable connection between the metal bands and the reinforcing member. Other means for securing these ends of the metal bands to the ends of the reinforcing member may be provided. The rubber portion of the anti-skid member is preferably molded around the connections between the bands and the reinforcing member so as to protect the same against moisture or foreign materials.

The metal bands extend beyond the ends of the strip. The band 21 is preferably made considerably longer than the band 20 and may, if desired, be partly covered by rubber, as shown at 29 to form a protective sleeve or coating about the longer band 21 to prevent damage to the paint or surface coating on the rim of the wheel.

Any suitable or desired means may be provided for securing the outer ends of the metal bands to each other when the anti-skid device is applied to a tire and rim. In the particular construction illustrated, I have provided a securing device which includes a worm 30 and which is secured to the shorter metal band 20 and which is formed to engage with worm teeth 31 formed on the other band 21. Preferably these worm teeth are formed by cutting a series of spaced slots or grooves in the outer face of the metal band 21. These slots or grooves form between them the teeth with which the worm may engage, and preferably these slots or grooves are cut only partly through the band 21 in order to provide teeth of ample strength. By turning the worm while the same is in engagement with the teeth 31, the anti-skid device may be tightened to any desired extent on the tire and rim.

The worm may be rotatably mounted on and held against lengthwise movement on the member 20 in any suitable or desired manner, and in the construction illustrated, I have provided a housing 33 extending about the worm and having a base part which is rigidly secured to the metal band 20. This housing in the construction shown, is formed of a strip or plate of metal bent to form a partly cylindrical portion which extends partly about the worm so as to envelop approximately about one-half or more of the peripheral portion of the housing. This housing also has laterally extending side portions 35 which provide spaces into which the edge portions of the other metal band 21 may extend. The sides of the metal strip or plate of which the housing is made are then bent inwardly toward each other to form a base 36 of the housing. It will be obvious that the housing may be cast or otherwise formed.

The housing may be secured to the band 20 in any suitable manner, for example, by welding the base 36 to the band 20. I prefer to secure the housing member to the band as in the construction illustrated, in which the base of the housing member is provided with tongues or projections 37 which may pass through slots or apertures in the band 20 and the ends of these projections may be bent over to form a secure mounting of the housing on the band 20. The projecting parts 37 may be stamped out of the metal of the housing in the same manner as the projections 24 of the bands 20 and 21, the remaining base portion 36 of the metal of the housing lying flatly against the band 20 and forming a base or support for the other band 21 when the same is passed into the housing in position to be engaged by the worm 30. In order to facilitate the actuation of the device, the worm may be provided at one end thereof with a transversely extending slot 39 into which a screw driver or other implement may be inserted to turn the worm. Preferably the housing extends slightly beyond this end of the worm, as clearly shown in Fig. 5, so that the screw driver will not tend to slide lengthwise of the slot 39 out of engagement with the worm.

Any suitable means may be provided for holding the worm against endwise movement in its housing 33, and in the construction shown for this purpose, by way of example, the worm is provided intermediate of the ends thereof with an annular slot or groove 40 into which a key or other device may be inserted to prevent endwise movement of the worm without interfering with the turning thereof. The housing part 34 is provided at one or both sides thereof with slots 42 which will normally be in registration with the groove 40 in the worm and a key 44 is provided which extends into the slot or slots of the housing and into the groove 40 of the worm. In the particular construction illustrated, the housing has slots on opposite sides thereof and the key 44 is of approximately U or horse-shoe shape so as to straddle the upper portion of the housing. The key is preferably provided with opposite ends 45 which extend toward each other and which may pass through the slots and enter the groove 40 of the worm. The key 44 is preferably made of metal which can readily be bent and which has comparatively little resilience so that it will remain in the form into which it is bent. Before the key is applied to the interlocking member, the ends 45 thereof are spaced apart sufficiently so that the grooved portion of the worm may readily pass between these ends, and after the key has been placed approximately into its operative position, pressure is applied to the opposite sides thereof, thus forcing the ends 45 into engagement with the worm well below the axis thereof, so that accidental removal of the key from the housing and out of engagement of the worm is prevented.

In the use of the interlocking device, the band 21 is inserted endwise into the housing between the worm and the base portion 36 of the housing. When the worm is turned in the correct direction, the worm will engage the teeth 31 of the band 20 so that this band will be driven through the housing to tighten the anti-skid device on the tire and wheel to the desired extent. In order to facilitate the insertion of the band 21 into the housing, the end portion 47 thereof may be of reduced thickness as clearly shown in Fig. 5.

The metal of the band 21 is preferably sufficiently flexible so that as the band passes into the space between the housing and the worm, it will, if bent, be straightened by the pressure of the worm. The worm teeth may extend for a considerable length along the band 21 so that the anti-skid device may fit tires and rims of different sizes.

One of the advantages of the construction described is that the entire anti-skid device will normally assume a substantially closed-loop position. The flexible strip, including the tread 12 and the side members 13, is molded in such a manner that it will normally lie in a position approximately as shown in Fig. 2, and the metal bands may also be bent into curved positions. This construction is particularly desirable in applying the anti-skid device to a tire and rim for the reason that in modern cars, the tires and rims are largely covered by the fenders, thus making it difficult to apply an ordinary mud hook or anti-skid device to such tires and wheels, since it is necessary to reach almost completely around a wheel to insert a strap of the anti-skid device through a wheel from the inner side thereof. This difficulty is particularly pronounced on some types of disk wheels in which only relatively small slots are provided through which the bands of anti-skid devices may be passed. By means of the construction illustrated, it is merely necessary for the operator to grasp the anti-skid device adjacent to the band 20 and then pass the other band around toward the inner face of the wheel. The inner end of the strap can then be easily passed between spokes of the wheel or into slots provided on disk wheels without making it necessary for the operator to reach around the wheel toward the inner face thereof. When the end of the strap 21 has been passed through to the outer side of the wheel, it is merely necessary to insert the end thereof into the space between the base 36 of the housing and the worm 30, whereupon the worm may be turned by means of a screw driver, coin, or other implement to tighten the anti-skid device on the tire and rim to the desired extent. The pitch of the threads of the worm is such that the worm will not turn during ordinary use of the anti-skid device, to permit the device to become loosened.

The term "rubber" is herein employed to designate not only natural rubber, but also any synthetic compositions or mixtures having properties similar to rubber.

It will be understood that various changes in the details, materials, and arrangements of parts which have been herein described and illustrated in order to explain the nature of the invention, may be made by those skilled in the art within the principle and scope of the invention, as expressed in the appeneded claim.

I claim as my invention:

An anti-skid device for use with a vehicle tire mounted on a wheel rim, including a strip of rubber adapted to extend across the tread of the tire, a reinforcing member of fabric material embedded in said rubber strip, a pair of metal bands each having one end secured to one end of said fabric reinforcing member and extending beyond the ends of said strip, the connections between said metal bands and said fabric reinforcing member being embedded in said rubber strip, said metal bands extending beyond the ends of said rubber strip, and interlocking member on the end portion of one of said bands and having parts for engaging with the other metal band to clamp said anti-skid device on a vehicle tire.

ADOLPH K. STEVENS.

REFERENCES CITED

The following references are of record in the file of this patent:

UNITED STATES PATENTS

| Number | Name | Date |
| --- | --- | --- |
| 1,872,003 | Pratt | Aug. 16, 1932 |
| 2,239,730 | Moore | Apr. 29, 1941 |
| 2,252,759 | Dodson | Aug. 19, 1941 |